Jan. 5, 1971 S. E. SMITH 3,552,987
METHOD FOR FABRICATING A SEAMLESS PLASTIC SURFACE HAVING
AN EMBOSSED, MULTICOLORED, TEXTURED, AND
PATTERNED APPEARANCE

Filed June 3, 1968 2 Sheets-Sheet 1

INVENTOR.
SAM E. SMITH
BY *Newton, Hopkins,*
*& Ormsby*
*Attorneys*

Jan. 5, 1971 S. E. SMITH 3,552,987
METHOD FOR FABRICATING A SEAMLESS PLASTIC SURFACE HAVING
AN EMBOSSED, MULTICOLORED, TEXTURED, AND
PATTERNED APPEARANCE
Filed June 3, 1968 2 Sheets-Sheet 2
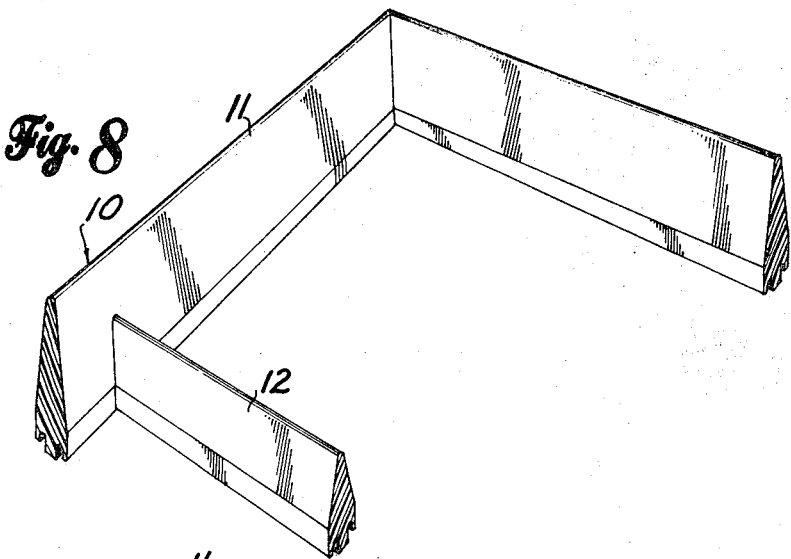
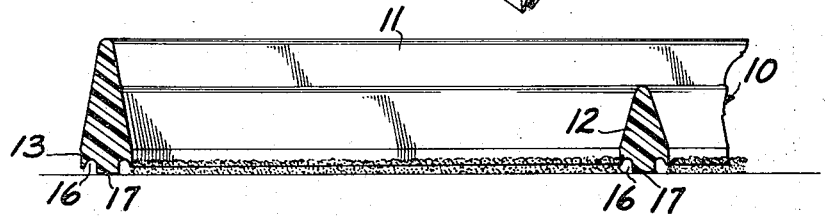
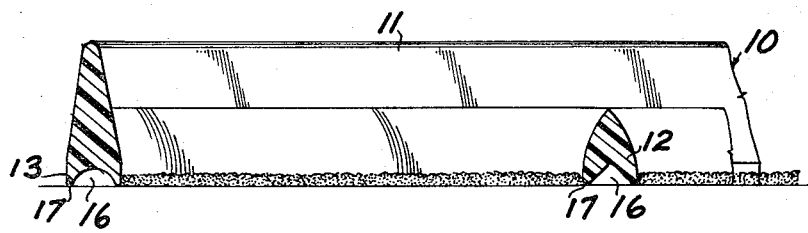
INVENTOR.
SAM E. SMITH
BY Newton, Hopkins,
& Ormsby
Attorneys

United States Patent Office 3,552,987
Patented Jan. 5, 1971

3,552,987
METHOD FOR FABRICATING A SEAMLESS PLASTIC SURFACE HAVING AN EMBOSSED, MULTICOLORED, TEXTURED, AND PATTERNED APPEARANCE
Sam E. Smith, 121 Tillman Lane, Athens, Ga. 30601
Filed June 3, 1968, Ser. No. 733,869
Int. Cl. B44c 1/06
U.S. Cl. 117—25
4 Claims

ABSTRACT OF THE DISCLOSURE

The present invention relates to a method and apparatus for fabricating a seamless plastic surface having an embossed multicolored, textured, and patterned appearance. The method includes applying a liquid plastic to the surface, positioning a template of a given pattern over the liquid plastic, distributing color particles onto the exposed liquid plastic within the confines of the template, removing the template, and allowing the coated surface to dry.

The template of the present invention has its outer boundary walls of greater height than the inner dividing walls. The width of the dividing wall is determined by the desired width of the pattern separation lines. Both the outer walls and the dividing walls are taped upwardly to prevent color particles from lodging on the template. The under surfaces of the template are formed either concave or with depending flanges so as to prevent the template from picking up any appreciable amount of liquid plastic when it is removed. The template is flexible so as to conform to irregularities in the surface to be coated.

BACKGROUND OF THE INVENTION

Field of the invention

This invention relates to formation of patterns and designs of varying levels, planes, textures, colors and shapes on surfaces. It is especially applicable for use on job sites for the installation of seamless plastic coatings. It is also applicable to processing of patterns on backing materials to produce pre-processed covering material.

SUMMARY OF THE INVENTION

The present invention relates to a method for forming different patterns and designs of varied colors, textures and levels through the use of specially designed templates or grids which are used in the application of bonding liquids and color granules or chips to produce a decorative finish on varied types of surfaces (i.e., floors, walls, ceilings, furniture, counters, building materials), at job sites and for application to backing materials for producing pre-processed coverings.

The pattern grid or template of the present invention prevents color granules or particles from being deposited in certain areas and directs the color granules or particles into predetermined patterns, shapes and designs, thereby creating a surface of more than one level, thickness, color, shape, design and texture. By controlling the color granules with a pattern grid or template unlimited designs may be produced with the realistic appearance of stone, brick, tile, masonry or any pattern decor that is desired.

These and other features and advantages of the present invention will become apparent from consideration of the following specification when taken in conjunction with the accompanying drawings.

BRIEF DESCRIPTION OF THE DRAWINGS

FIG. 8 is a perspective view of a segment of a template with portions being sectioned;
FIG. 9 is an elevational view of a segment of a template with portions being sectioned showing the liquid plastic and color particles within the confines of the template;
FIG. 10 is a view similar to FIG. 9 showing a second embodiment of the under surface of the template;
and
FIG. 11 is a flow chart showing the primary steps of the method of the present invention;

DESCRIPTION OF AN ILLUSTRATIVE EMBODIMENT

Figure 1:
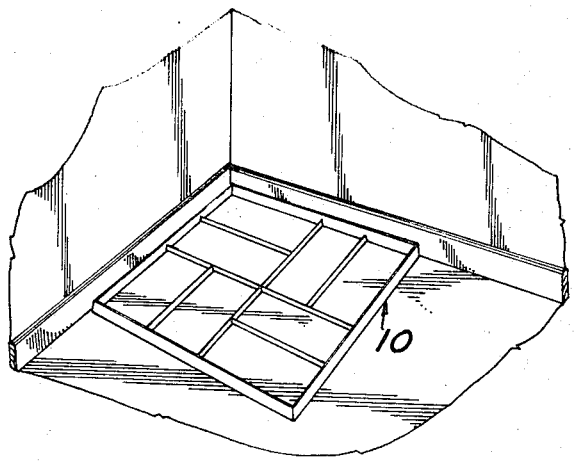
FIG. 1 is a perspective view of a template of the present invention placed on a floor section that is to be processed.
Figure 2:
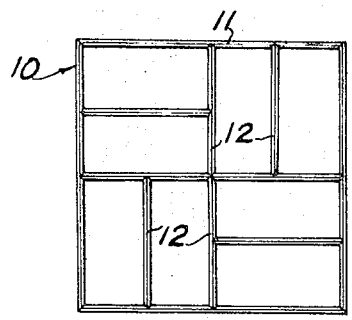
FIG. 2 is a template of a brick and mortar design.
Figure 4:
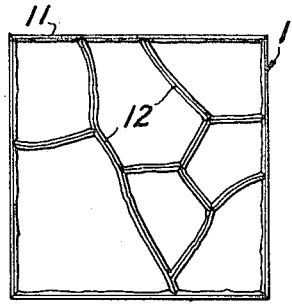
FIG. 4 is a template of a field stone and mortar design.
Figure 6:
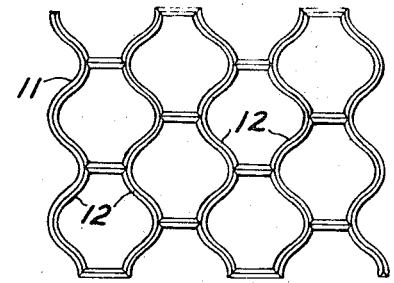
FIG. 6 is a template of a mosaic design.
Figure 3:
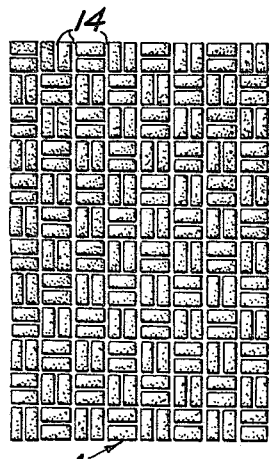
FIG. 3 is a segment of a surface produced with the template shown in FIG. 2.
Figure 5:
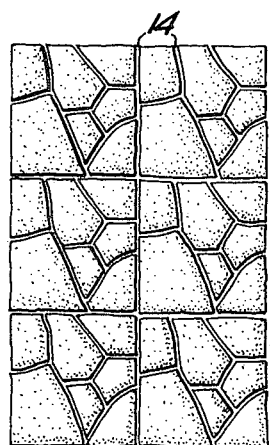
FIG. 5 is a segment of a surface produced with the template shown in FIG. 4.
Figure 7:
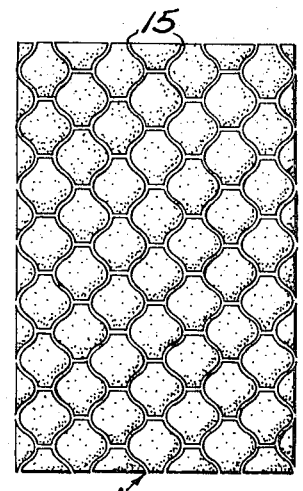
FIG. 7 is a segment of a surface produced with the template shown in FIG. 6.

The pattern grid or template 10 is made in the size, shape and design that may be desired for practical handling. For better control of color granules, the outside perimeter walls 11 of pattern grid 10 are higher than the inner dividing walls 12. The width 13 of the dividing walls 12 is determined by the width desired for the mortar joint 14 or pattern separation line 15 of area A. The walls 12 taper upward to prevent color particles from lodging on the grid and to direct color particles onto the exposed surface within the template pattern.

The under surfaces 16 are undercut so as to provide at least one depending flange 17. It will be seen that the embodiment shown in FIGS. 8 and 9 present a lower surface having a transverse width that is less than the maximum transverse width of said walls 11 and 12.

In the embodiment shown in FIG. 10, the under surface 16 is concave. By these arrangements a minimum of plastic adheres to the template 10 when it is removed. The template 10 should possess flexibility so as to conform to irregularities in the surface to be processed. Templates may be made of cast epoxy polyesters reinforced with fiber glass or from polyurethane, wood, or cast metal.

THE METHOD

The surface to receive a pattern finish should be prepared to receive the bonding liquid or adhesive that will secure the color granules. If clear bonding liquid is used, the surface should be prepared with the color that is desired for the mortar joint or pattern separation area. If a textured or sand finish mortar joint or separation area is desired, granulated material (sand or fine light weight aggregate) may be broadcast onto the surface coating while wet or added to the coating material before applying it. The textured or sand finish separation area may be produced by adding aggregate material to the adhesive or bonding coating that is used to receive and secure the decorative color granules for pattern creation. If pigmented or opaque bonding liquid is used to secure color granules, this material should be of the color desired for the mortar joint or separation area.

After surface preparation is completed for the area to be patterned, the bonding liquid or adhesive is applied to the surface covering an area approximately one inch larger than pattern grid only. Except when a non-patterned border is desired, bonding liquid will be applied to the border area adjacent to each pattern grid placement. Bonding liquid should be applied evenly and of thickness necessary to bond the color granules. The pattern grid is then placed onto the liquified surface for alignment of pattern continuation.

Color chips or granules are broadcast into the confines of the pattern grid and outside the pattern grid between the wall or unprocessed area and pattern grid that is to be the border part of the pattern. Care should be taken to disperse the chips into the liquid area in a vertical direction to allow the grid to disperse the chips in a sharper pattern line. It is important to broadcast the chips into this area as evenly as possible while providing a complete coverage of the exposed liquified surface. The color and texture of the embossed pattern is unlimited. Color granules or chips may be selected in one color or multiple mixed colors to simulate reproductions of stone, tile, masonry or any materials or decor desired. If accent shading, burned effect or graining is desired in pattern units, these accent color particles should be broadcast at this stage. When accent shading is to be used, care should be taken to avoid excess distribution of primary color chips so that liquid undercoating will bond a good percentage of the shading colors. For the burned effect around edge of pattern, the accent color particles are distributed in a vertical direction on top of the grid dividing line units. For graining or variation in color, texture and/ or level of the pattern accent, color particles may be distributed in various directions by allowing the accent chips to be dispersed in elongated lines and variations.

After complete dispersement of all color particles, the pattern grid should be lifted with care in a vertical direction and placed on a work sheet or canvas away from the immediate working area. It is important that the installer prevent loose chips from falling into the protected dividing joint area. It is also important that loose chips be brushed from the grid before the next placement of pattern grid. Bonding liquid is applied on the surface adjacent to the preceding application. The pattern grid is placed into the newly liquified area adjacent to and in alignment with the preceding pattern casting. Color chips are broadcast into the grid and border area. If border design is not desired, the pattern grid is placed at the edge of surface to be patterned.

For the continuation of the pattern casting as previously described, the procedure is repeated across the area until the pattern is terminated at the wall area or other determined point. The pattern casting procedure is continued with as many additional rows of pattern grid placements as required to cover a surface. Each additional row or placement of the pattern grid should be placed to continue alignment of the pattern. Pattern grids that have a repeat pattern may be moved less than the full width of the grid so that pattern may be placed closer to offsets in the surface that is being patterned. Care should be taken when overlaying part of pattern grid over the precast section to align the pattern grid dividing segments with the precast pattern dividing segments. For continuing the pattern closer to offsets, walls or the edge of the surface that is being patterned, extra parts and sections of pattern grid dividing segments are placed onto the liquid surface between the edge of pattern grid and edge of surface before disbursement of color granules. Extra segment parts should be removed and handled the same as the main pattern grid. A suitable bonding adhesive is polyurethane plastic in the liquid or flowable state.

The color particles may be pigmented paint chips such as acrylic paint. They must be of a type that does not dissolve in the bonding liquid. Natural aggregate may be used for separation lines or mortar joints.

In summary, the following is an example of processing a concrete floor by the method of the present invention. The separation lines will be the color of the concrete. The floor is primed with a bonding liquid that is thinned approximately 25% and allowed to dry for one hour. If sand or textured separation lines are desired, sand is sprinkled over the wet primer.

The bonding liquid is applied to a depth of approximately 1/16 inch. The grid or template is positioned and color chips are distributed. This area is allowed to dry from two to four hours. The area is then vacuumed or swept to remove loose chips. Three to four coats may be applied. When multi-coats are used, the first coat is usually allowed to dry for four hours and the subsequent ones for only two hours.

I claim:

1. A method for fabricating a seamless plastic surface having an embossed, multicolored, textured, and patterned appearance comprising:

applying a coating of hardenable liquid plastic to a stationary substantially horizontal surface;

said liquid plastic being of a color and texture selected for the resulting pattern separation lines;

manually positioning a template having upwardly tapered outer boundary and inner dividing walls of a given pattern on said liquid plastic;

distributing dry color particles onto the exposed liquid plastic within the confines of said template;

said template preventing the distribution of the dry color particles onto those portions of the liquid plastic beneath said template by directing substantially all of the dry color particles onto said exposed liquid plastic thereby defining the pattern separation lines;

manually removing said template in a substantially vertical direction from said liquid plastic; and, allowing said plastic to harden.

2. A method for fabricating a seamless plastic surface having an embossed, multicolored, textured, and patterned appearance comprising:

covering a stationary substantially horizontal surface with a liquid plastic and a material that will produce a first selected texture and color;

allowing said textured and colored plastic coating to dry;

introducing on said dried plastic surface a further coating of clear hardenable liquid plastic;

manually placing a template having upwardly tapered outer boundry and inner dividing walls of a selected pattern on said clear liquid plastic;

distributing dry particles of a second color and texture within the confines of said template;

said template preventing the distribution of the dry color particles onto those portions of the liquid plastic beneath said template by directing substantially all of the dry color particles onto said exposed liquid plastic thereby defining the pattern separation lines;

manually removing said template in a substantially vertical direction from said liquid plastic;

relocating said template in an adjacent relationship to carry out a continuous pattern; and allowing said second colored and textured surface to dry.

3. A method as defined in claim 2 and further characterized by:

removing any loose particles from thhe resulting embossed surface; and applying an additional coat of clear plastic.

4. A method for fabricating a seamless plastic surface having an embossed, multicolored, textured, and patterned appearance comprising:

applying a coating of hardenable liquid plastic to a stationary substantially horizontal surface;

said liquid plastic being of a color and texture selected for the resulting pattern separation lines;

manually positioning a template having upwardly tapered outer boundry and inner dividing walls of a given pattern on said liquid plastic;

distributing dry primary color particles onto the exposed liquid plastic within the confines of said template;

said template preventing the distribution of the dry color particles onto those portions of the liquid plastic beneath said template by directing substantially all of the dry color particles onto said exposed liquid plastic thereby defining the pattern separation lines;

vertical distributing dry accent particles of a color different from said primary color along the top of said dividing walls to achieve a burned effect adjacent the edges of said separation lines;

manually removing said template in a substantially vertical direction from said liquid plastic; and, allowing said plastic to harden.

References Cited

UNITED STATES PATENTS

| | | | |
|---|---|---|---|
| 2,056,275 | 10/1936 | Holdsworth | 117—25 |
| 2,334,112 | 11/1943 | MacKinney | 117—25 |
| 2,639,995 | 5/1953 | Perry et al. | 117—25X |
| 2,704,905 | 3/1955 | Ernst | 117—8.5 |
| 2,728,685 | 12/1955 | Muench | 117—25 |
| 3,104,184 | 9/1963 | Wengenroth | 117—25X |
| 3,238,053 | 3/1966 | Morgan | 117—17.5 |
| 3,402,093 | 9/1968 | Riva | 117—25X |
| 3,446,644 | 5/1969 | Murphy et al. | 117—25 |

FOREIGN PATENTS

| | | | |
|---|---|---|---|
| 251,780 | 5/1964 | Australia | 117—21 |
| 540,851 | 5/1957 | Canada | 117—25 |
| 698,533 | 11/1964 | Canada | 117—25 |

WILLIAM D. MARTIN, Primary Examiner

P. ATTAGUILE, Assistant Examiner

U.S. Cl. X.R.

117—26, 28, 33

UNITED STATES PATENT OFFICE
CERTIFICATE OF CORRECTION

Patent No. 3,552,987      Dated January 5, 1971

Inventor(s) Sam E. Smith

It is certified that error appears in the above-identified patent and that said Letters Patent are hereby corrected as shown below:

Column 1, line 26, "taped" should appear as ---tapered---.

Signed and sealed this 27th day of March 1973.

(SEAL)
Attest:

EDWARD M. FLETCHER, JR.
Attesting Officer

ROBERT GOTTSCHALK
Commissioner of Pate